Feb. 28, 1956 H. W. ATKINS 2,736,534
FLAVOR MIXING VALVE
Filed Feb. 12, 1953
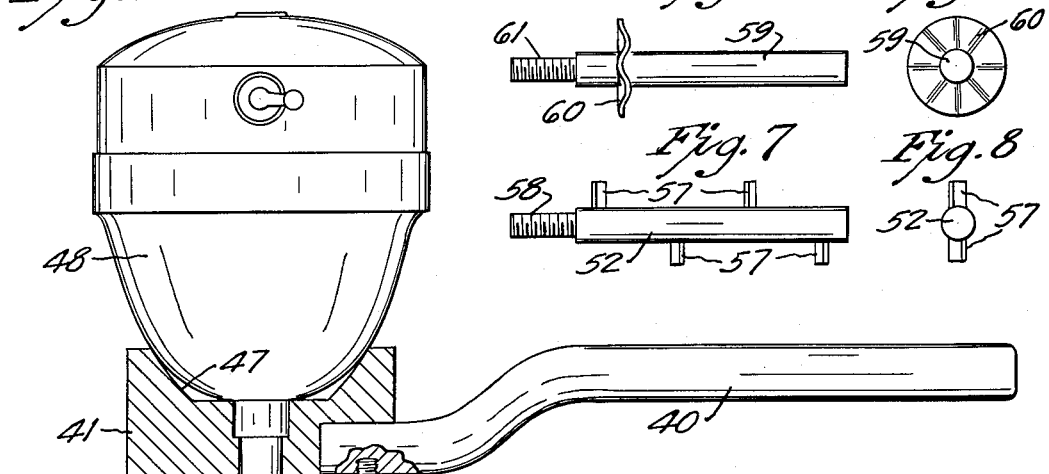
INVENTOR.
Harold W. Atkins
BY
Williamson, Williamson, Schroeder & Adams
ATTORNEYS United States Patent Office
2,736,534
Patented Feb. 28, 1956

2,736,534

FLAVOR MIXING VALVE

Harold W. Atkins, Minneapolis, Minn., assignor to Dari-Go-Round, Inc., Minneapolis, Minn., a corporation of Minnesota Application February 12, 1953, Serial No. 336,606

3 Claims. (Cl. 259—8)

This invention relates to a flavor mixing valve and more particularly to a self-contained valve for controlling the incoming flow of frozen product, such as milk shake, and flavoring fluid thereto while also controlling the intermixing and outward flow therefrom.

This application embodies certain improvements over the extrusion valve disclosed in my co-pending application entitled Ice Cream Flavor Inserter, Serial Number 178,334, filed August 8, 1950. The valve disclosed in that application is of the type which will cause selected flavors of syrup under pressure to be inserted into frozen products extruded under pressure, the product and flavor being metered and controlled as they are simultaneously withdrawn. There was no attempt in practicing the disclosure of my above co-pending application to uniformly mix the flavor and frozen product and furthermore no need to restrict passage of the flavor product at the outlet of the valve once it had been treated and intermixed with the flavor syrup.

It is a general object of the present invention, however, to provide for a self-contained mixing valve in introducing one of several flavors selectively into any of several frozen food products. The flavor and frozen product are mixed to the desired degree prior to being delivered in controlled fashion from the valve.

It is another object of this invention to provide for a mixing valve which is adapted to be placed at the outlet of a freezer device for producing selectively such frozen food products of widely varying viscosities as ice cream, malted milks and milk shakes, and inserting and mixing flavor syrup in a controlled manner within the valve and before dispensing therefrom.

It is a further object of the invention to provide for a valve of the class described in which a rotary element is disposed within the valve for mixing metered quantities of frozen food product and flavor syrup while providing a restricted outlet for the mixed product to delay flow through the valve and conversely, to increase the mixing time thereof according to the amount of intermixing desired.

These and other objects and advantages of my invention will more fully appear from the following description made in connection with the accompanying drawings wherein like reference characters refer to similar parts throughout the several views and in which:

Figure 1 is a vertical section of my flavor mixing valve mounted upon the outlet of a continuous freezing device, the outlet being broken away and certain parts in the view being shown in full line;

Figure 2 is a bottom view of my flavor mixing valve attached to the broken outlet of a continuous freezing device;

Figure 3 is a horizontal section of the valve taken on the line 3—3 of Figure 1;

Figure 4 is a vertical section through the flavor selector taken on the line 4—4 of Figure 1;

Figure 5 shows an agitator attachement which may be used with my flavor mixing valve;

Figure 6 is an end view of the attachment shown in Figure 5;

Figure 7 is another form of agitator attachment which may be employed in my mixing valve; and Figure 8 is an end view of the attachment shown in Figure 7.

Referring now to the drawing, my mixing valve comprises a casing member 10 having a frusto-conical bearing surface 11 formed therewithin and a cap 12 overlying the frusto-conical bearing surface and being threadably connected to the casing at 13. The casing 10 has an inlet passage way 14 which is attached to the product outlet 15 of a continuous freezing device for the manufacture of such products as ice cream, malted milks, sherbets, milk shakes and the like. The freezing device is conventional in nature and forms no part of the present invention, the outlet therefor being broken away adjacent its point of attachment to the device. The product inlet 14 may be secured to the outlet of the freezing device by such a means as coupling collar 16 mounted over an end flange 17 and threadably engaged at 18 to the end of the valve inlet 14.

The casing 10 has another common inlet 19 to which may be attached a smaller valve such as the flavor selector 20. The flavor selecting valve may be of the type fully disclosed in my co-pending application, having, in the form shown, a three-way inlet comprising tubular connectors 21, 22 and 23, as shown in Figure 4. Each of these tubular inlets may be connected with a container (not shown) containing a flavor syrup under pressure. A frusto-conical valve core 24 has an L-shaped passage way 25, the horizontal end of which is adapted to communicate with the single flavor inlet 19 and the laterally extending portion of which is adapted to communicate selectively with one of the inlet tubes 21, 22 or 23. A handle member 26 has an L-shaped bend 27 at the outer end thereof to indicate alignment of the L-shaped passage way with one of the inlet tubes for flavor syrup. In Figure 1, the alignment is such as to communicate with the upper tubular inlet 21. A cap 28 is threadably secured to the outer end of the boss 29 in which the inlet 19 and the valve core 24 are located. A compression spring 30 bears upon the inside surface of cap 28 and upon a flat disc or washer 31 having dimples or indentations in annular spaced relation thereupon for engaging a pin or detent 32 positioned in the frusto-conical valve core 24. The flat disc or washer 31 is non-rotatable with respect to the boss 29, a small abutment 33 being slidably engaged by a longitudinal slot in said boss. The pin or detent 32 is so arranged with respect to the indentations 34 that the flavor syrup inlet 25 will be aligned with one of the plurality of openings whenever the detent engages one of the dimples or indentations 34. It is understood, of course, that the detent does not latch the valve, but merely positions it releasably in a flavor selecting position. It is preferred that all the sources of flavor fluid be under equal pressure for delivering the fluid to the tubes 21, 22 and 23. It is understood, of course, that where desired, a more viscous fluid may be supplied with a greater relative pressure so as to accomplish an equivalent flow of fluid. Where it is desired to insert a larger quantity of flavor per unit quantity of frozen food product, a smaller amount of pressure may be supplied to the flavor fluid. The application of pressure for increasing or decreasing the rate of flow of a viscous fluid is, of course, well known to physical science.

The main extrusion valve casing 10 has disposed therewithin and relatively movable therewith, a core element 35. The core element may be frusto-conical in shape to fit the frusto-conical bearing surface 11 of the casing 10 and may be said to constitute generally an open ended cylinder having a space 36 therewithin for providing for intermixing of frozen fluid. The space 36 has an orifice 37 for registering with the product inlet 14. The product inlet 14 and the orifice 37 constitute a first passage way communicating with the core space 36 for the introduction of frozen food base.

The core 35 has a smaller orifice 38 which also communicates with the space 36 at its inside end and with the passage way 36 at its outer end. The common flavor inlet passage way 25 together with the orifice 38 comprises a second passage way for leading flavor syrup into the core space 36 for intermixing with the frozen food base coming from the continuous freezer into the same space.

The orifice 37 and orifice 38 are adapted to be in full registry with their respective cooperating inlets 14 and 19. However, in order to obtain a proportioning or metering of the flavor fluid with respect to the frozen food base, I provide a tapering groove or channel 39 so that the diameter of orifice 38 plus the groove extension 39 will be substantially equal to the diameter of the orifice 37. The groove 39 is so shaped and tapered as to cause a small amount of flavor to begin to flow into the core 35 at the same instant that the frozen food base begins to flow into the core 35 from the product inlet 14. As the core 35 is relatively moved with respect to the casing 10, the flavor fluid will increase in flow proportionately to the increase in flow of frozen food base and, hence, be properly metered and proportioned. The relative movement of the core 35 with respect to casing 10 may be accomplished through a handle 40 which is attached to a block 41 having a reduced cylinder extension 42 which, in turn, is fastened to a reduced upper cylindrical extension 43 formed at the upper end of core 35. The means of attachment may be a threaded set screw connection 44 as shown in Figure 1. The orifices 37 and 38 may be kept in fluid-tight relation with the bearing wall 11 of the casing 10 by means of a compression spring 45 interposed between the innermost surface of cap 12 and a shouldered portion 46 formed at the juncture of the core 35 with its reduced cylindrical portion 43.

The block 41 is formed with a dish-shaped seat 47 which is adapted to cradle a stirring motor 48 as shown in Figure 1. The motor 48 is preferably a series-wound motor which is adapted to give a wide range of speeds without sacrificing its power requirements. The motor 48 has a vertical rotating shaft 49 which extends downwardly through the block 41, through the interfitted cylindrical extensions 42 and 43 and through an axial opening 50 formed in the upper portion of casing 35 and in alignment with the cylindrical bore or space 36. The shaft 49 has an annular threaded connection 51 at its lower end to which may be threadably secured a stirring attachment 52. A resilient seal 53 may be annularly positioned about the shaft 49 so as to prevent the upward flow of product from the space 36. A small opening 54 is drilled through the casings 42 and 43 so as to be in circumferential alignment with an indentation 55 in shaft 49. The hole 54 and indentation 55 are for the purpose of inserting a pin 56 to prevent relative movement of shaft 49 with respect to the casing 35 when it is desired to screw or unscrew the attachments such as the attachment 52.

Details of the stirring attachment 52 are shown in Figures 7 and 8. The particular attachment shown has staggered abutment members 57 which may be given a slight angulation as shown to either encourage the downward flow of mixed product or to discourage the flow depending upon which way the attachment 52 rotates and which way the angulation is formed. The reduced threaded portion 58 is adapted to cooperate with the axial threaded hole 51 as previously described. Another form of stirring attachment or rotor is shown at 59 in Figure 5. In this instance, the abutment is formed from a disc 60 secured axially to the attachment 59 and having a scalloped form shown more clearly in Figure 6 whereby to cause the frozen food base and the flavor fluid to be thoroughly intermixed as it passes through the valve space 36. The mixing attachment or rotor 59 has a threaded reduced portion 61 which is adapted to be secured to the axial threaded hole 51 when it is desired to replace an attachment such as 52 shown in Figure 1. It is understood, of course, that many other types of rotors may be employed for agitating or intermixing the product within the core depending upon the effect desired.

Since my flavor mixing valve is designed for great versatility with respect to hard products such as ice cream on the one hand and relatively thin and flowable products such as milk shakes on the other hand, I provide for a restricted outlet for the cylindrical space 36 within core 35 which is preferably formed as a replaceable choke 62 which can be threadably attached at 63 to a depending reduced cylindrical portion 64 of the core member 35. The choke 62 can be formed with a reduced orifice 65 which will restrict the outward flow of product according to its viscosity. Thus, where it is desired to delay the flow of the flavor fluid and product therethrough, a choke 62 is selected with an orifice 65 which will be relatively smaller than the diameter of the cylindrical bore or space 36. Such an arrangement is desirable where my flavor mixing valve is employed for making milk shakes. Since the milk shake base would tend to travel at a fast rate through the space 36, I choke the flow by means of a more restricted outlet orifice 65. This will, in turn, give a greater mixing time for thoroughly incorporating the flavor fluid which is simultaneously inserted through the orifice 38. On the other hand, where I mix flavor fluid into a stiff product such as ice cream, I may desire to have the outlet orifice completely unrestricted in which case I can use a choke member 62 without tapering the orifice 65 or may completely dispense with the choke. I can also vary the speed of the motor 48 so as to accomplish a number of effects in the mixing of the flavor fluid. By means of such an attachment as that shown in Figure 1 operating at a very slow speed, I can cause the selected flavor syrup entering through orifice 38 to be inserted into the frozen food base in a streaked or discontinuous manner. In spite of the discontinuous insertion of the flavor, it still may be added in a controlled manner and in the proportions desired.

It may thus be seen that I have devised a novel and useful flavor mixing valve which can be adapted to intermix one of a plurality of flavor syrups into one of a plurality of frozen food base types ranging from a thick and viscous product such as ice cream to a relatively thin product such as a milk shake, and, at the same time, being able to incorporate the flavor in a controlled manner with various degrees of intermixing. The foregoing is all accomplished while being able to dispense any quantity desired ranging from a small low-priced cup of finished product to a large containerful such as may be ordered to be taken home from the point of dispensing. The quick change coupling 16 may adapt a single flavor mixing valve such as I have shown to be consecutively secured to one of a battery of continuous freezers. If, for example, two of my flavor mixing valves be employed with four continuous freezers, a variety of products including ice cream, sherbets, malted milks and milk shakes may be dispensed and each being flavored to suit the desires of the purchaser. The resulting ease and economy of operation will be apparent to one skilled in the art.

It will, of course, be understood that various changes may be made in the form, details, arrangement and proportions of the parts without departing from the scope of my invention which consists of the matter shown and described herein and set forth in the appended claims.

What I claim is:

1. A flavor mixing valve adapted to be attached to the outlet of a freezing device designed for the manufacture of such frozen food bases as ice cream, milk shake and the like comprising, a casing having a first and a second inlet in the side wall thereof, an open-ended cylinder rotatably journaled within the casing, a first orifice in the side of said wall of said cylinder adapted to cooperate with the first inlet in the casing for the introduction of frozen food base, a second orifice in the side wall of said cylinder adapted to cooperate with a second inlet in said casing for the introduction of flavor fluid, means for adjustably rotating said open-ended cylinder to permit the simultaneous and metered entrance of frozen food base and flavor fluid, and stirring mechanism mounted on said valve and having rotatable extension lying within said open-ended cylinder and extending in clearance with the inner walls thereof to a position intermediate both of said cylinder inlets and the open end thereof whereby said rotatable extension may be rotated at a controlled speed to intermix said frozen food base and said flavor fluid in a continuous manner as they pass through the cylinder and out the open end.

2. A flavor mixing valve adapted to be attached to the outlet of a freezing device designed for the manufacture of such frozen food bases as ice cream, milk shake and the like comprising, a casing having a first and a second inlet, an open-ended cylinder rotatably journalled within the casing, a first orifice in said cylinder adapted to cooperate with the first inlet in the casing for the introduction of frozen food base, a second orifice in said cylinder adapted to cooperate with a second inlet in said casing for the introduction of flavor fluid, means for controlling the rotation of said open-ended cylinder, and a stirring rotor mounted upon said cylinder and extending rotatably and axially into said cylinder for intermixing the frozen food base with flavor fluid prior to dispensing of the mixed product from said open-ended cylinder.

3. A flavor mixing valve adapted to be attached to the outlet of a freezing device designed for the manufacture of such frozen food bases as ice cream, milk shake and the like comprising, a casing having a first and a second inlet, an open-ended cylinder rotatably journaled within the casing, a first orifice in said cylinder adapted to cooperate with the first inlet in the casing for the introduction of frozen food base, a second orifice in said cylinder adapted to cooperate with the second inlet in said casing for the introduction of flavor fluid, means for adjustably controlling the rotation of said open-ended cylinder, and a stirring rotor mounted axially of said cylinder and extending rotatably into one end of said cylinder, said cylinder having a restricted dispensing nozzle at the open end opposed to that receiving said stirring rotor whereby said frozen food base will be intermixed to the desired extent with flavor fluid prior to dispensing thereof from said dispensing nozzle.

References Cited in the file of this patent

UNITED STATES PATENTS

| | | |
|---|---|---|
| 300,170 | Van Riper et al. | June 10, 1884 |
| 2,190,226 | Alexander | Feb. 13, 1940 |
| 2,246,871 | Balch | June 24, 1941 |
| 2,249,311 | Johnston et al. | July 15, 1941 |
| 2,262,293 | Lilja et al. | Nov. 11, 1941 |
| 2,313,060 | Friedman | Mar. 9, 1949 |